Figure 5:
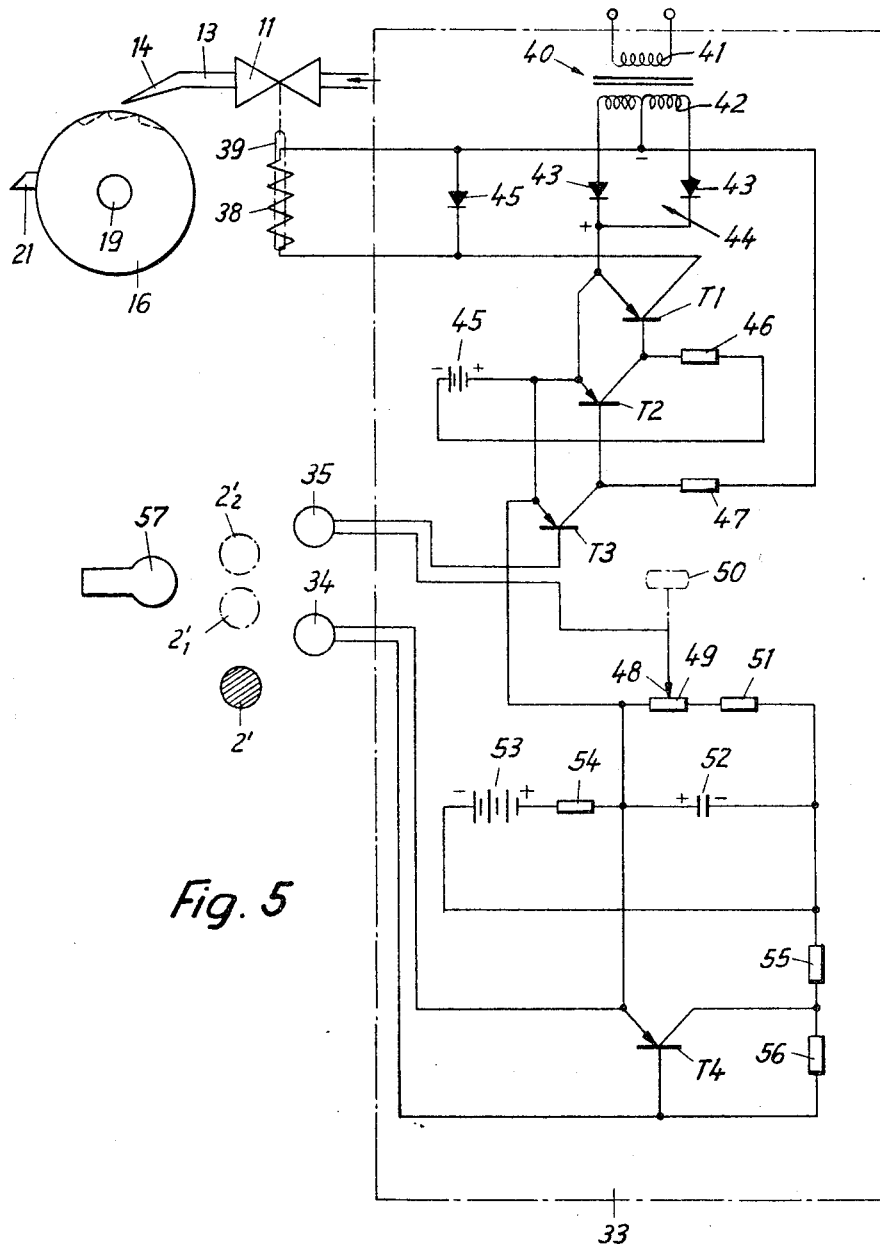

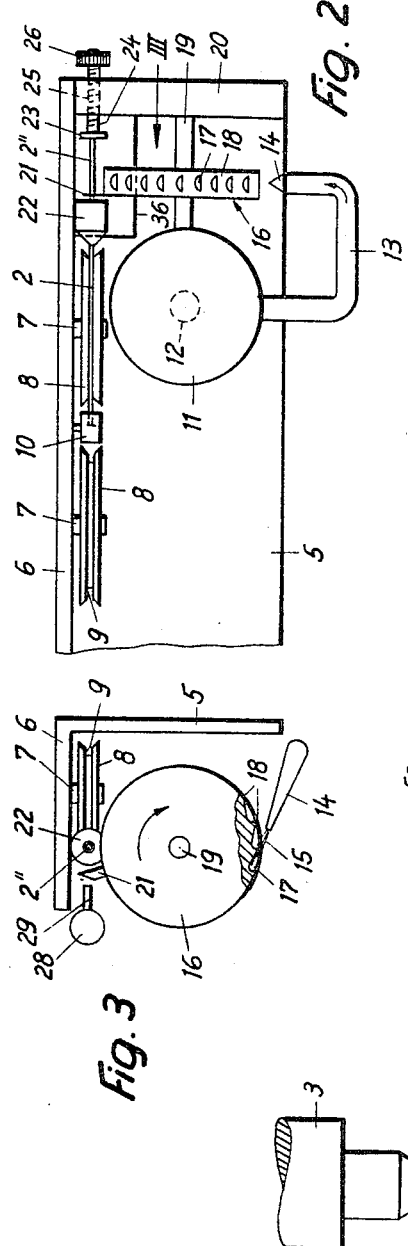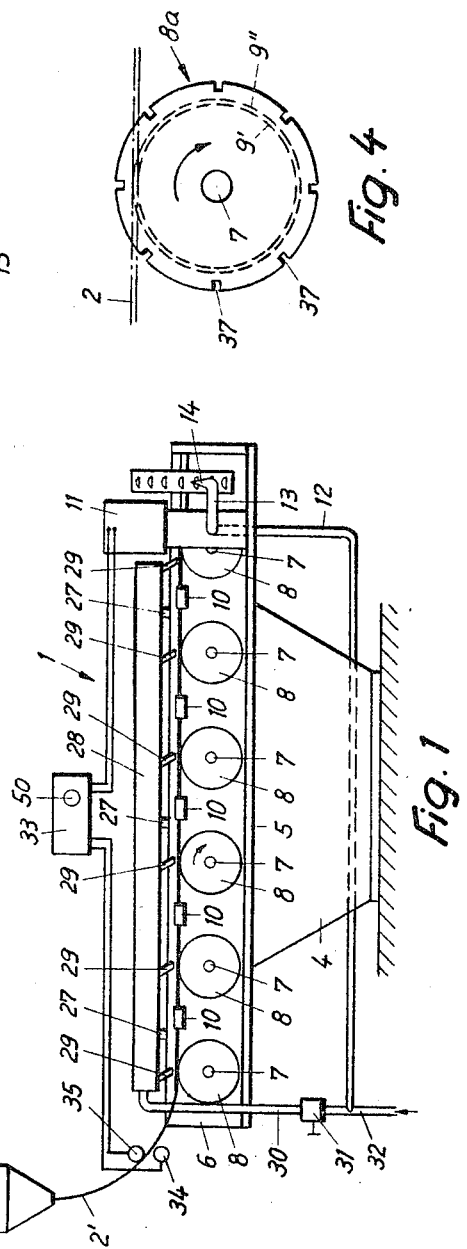

INVENTOR:
RUDOLF DIENER
By E. M. Squire
HIS ATTY

United States Patent Office 3,283,627
Patented Nov. 8, 1966

3,283,627
METHOD AND APPARATUS FOR CUTTING
PIECES OFF A LENGTH OF MATERIAL
Rudolf Diener, Zurich, Switzerland, assignor to
Eldima A.G., Zurich, Switzerland
Filed Nov. 3, 1964, Ser. No. 408,561
Claims priority, application Switzerland, Nov. 4, 1963,
13,489
21 Claims. (Cl. 83—42)

This invention relates to methods and apparatus for cutting pieces off a length of material and particularly to a method and apparatus for carrying out said cutting.

It is an object of the present invention to provide a method of cutting pieces off a length of material, which method results in more rapid cutting than has hitherto been possible. It is also an object of the present invention to provide apparatus for performing said cutting.

According to one aspect of the present invention there is provided a method of cutting pieces off a length of material, which method comprises advancing the length towards a stop through the path of a cutter rotating in a plane transverse to the direction of advance of the length so that the cutter acts to cut off said piece when the end of the length abuts against the stop, the cutter being rotated under the action of a jet of fluid so that the intensity of said jet controls the speed of rotation of the cutter, and controlling the intensity of said jet by the rate at which said length end abuts against said stop.

According to another aspect of the present invention there is provided apparatus for carrying out the aforesaid method, which apparatus comprises a stop, means for advancing a length of material towards said stop, a cutter, a vaned wheel carrying said cutter so that the cutter is rotatable in a plane transverse to the direction of advance of the length to cut off a piece of material when the free end of the material abuts against the stop, means for directing a first jet of fluid on to the vanes of said wheel to rotate same, jet intensity-varying means for varying the intensity with which said jet is directed on to said vanes in response to variations in the speed with which said length end abuts against said stop.

The strip is preferably extruded under pressure in such a way that it can sag when its free end abuts against the stop so that the amount of sagging is controlled by the rate at which said strip end abuts against the stop, the amount of sagging being utilized to control the intensity of the fluid jet controlling the speed of rotation of the cutter.

The method of the invention is preferably applicable for cutting into pieces a rod consisting of explosive material, such as nitro-cellulose.

Variations in the amount of sagging may be utilized to produce an electric impulse, for example through the agency of a photo-sensitive element which is either illuminated by or cut off from a light source by the sagging length in accordance with the amount by which said length sags. The said electric impulses may be used to control an electro-magnetically operated valve in the supply of fluid, which is preferably compressed air, to the jet.

Other features of the present invention will be readily apparent from the following description made with reference to the accompanying drawings in which:

FIG. 1 is an elevation of one form of apparatus according to the invention;
FIG. 2 is a plan view of part of the device shown in FIG. 1, to an enlarged scale;
FIG. 3 is a view of a detail in the direction of the arrow III in FIG. 2;
FIG. 4 is an elevation of a variant of feed rollers used in the apparatus of FIG. 1; and
FIG. 5 is the circuit diagram of a control device for an electromagnetic valve used in the apparatus of FIG. 1.

Referring to the drawings a cutting device 1 is illustrated and is used for cutting a—for example—2.5–3 mm. thick nitrocellulose rod 2 continuously produced by an extrusion press 3, into pieces of a predetermined length in the range of 5–15 mm. for example. The cutting device 1 comprises a frame 4 provided with a tabletop 5 and a side wall 6 extending along the latter and provided with a number of horizontal spindles 7 each bearing a freely rotatable feed roller 8. Each feed roller 8, which is formed for example, of nylon has a groove 9 extending around its periphery, the bottom part of such groove having a rectangular cross-section corresponding to the diameter of the rod 2, while the outer-portion diverges laterally and radially outwardly in the form of a V. Horizontal guide bushings 10 to guide the rod 2 are provided between adjacent ones of the rollers 8 being mounted on the side wall 6.

Near the right-hand end of the tabletop 5 with reference to FIGS. 1 and 2 an electromagnetic valve 11 is mounted on the tabletop and receives compressed air via a conduit 12 which is connected to the valve 11 at the bottom. An outlet conduit 13 provided laterally of the valve 11 terminates in a nozzle 14 which directs a jet of air 15, as in FIG. 3, to a vane wheel 16 the periphery of which has pockets 17 which form vanes 18 between them. The vane wheel 16 is freely rotatable on a spindle 19 parallel to the side wall 6, for example by means of ball bearings. The spindle 19 is mounted in an end wall 20 at one end and in the housing of the valve 11 at the other end.

Part of the periphery of the vane wheel 16 is provided with a radially projecting cutter blade 21, as in FIG. 2, which cuts through the rod 2 in the immediate vicinity of a guide bushing 22 consisting, for example, of "Teflon" (registered trademark), through which the rod 2 passes after leaving the last feed roller 8. Aligned with the bushing 22 is a stop 23 secured to the end of an adjusting screw 24 mounted in a threaded bore 25 in the end wall 20 and provided with a knurled adjusting knob 26.

A compressed air manifold 28 is mounted above the rollers 8, being secured to the side wall 6 by support arms 27 and its underside is provided with a number of outlet nozzles 29 directed at an angle to the rollers 8. The manifold 28, which for the sake of clarity has been omitted from FIG. 2, is connected via a conduit 30 and an adjustable stop element 31, for example in the form of a valve or cock, to a compressed air supply conduit 32. The supply conduit 32 is also connected to the conduit 12 which leads to the electromagnetic valve 11.

The latter is controlled by a control device 33 which in FIG. 1 is shown positioned above the frame 4 for clarity of illustration, but which, in practice, will be mounted on the frame 4. The same applies to two photo-resistances 34 and 35 disposed at different heights near the part 2' of the rod 2 sagging between the extrusion press 3 and the feed rollers 8 and electrically connected to the control device 33. The latter and the photo-resistances 34 and 35 are used to control the speed of revolution of the vane wheel 16 and hence the number of cuts per unit of time in accordance with the speed at which the rod 2 leaves the extrusion press 3. Before discussing this control system the operation of the cutter blade 21 will be explained with reference to FIGS. 1 to 3.

The adjustable valve 31 is opened until strong jets of air from the nozzles 29 reach the rod 2 and press the same into the grooves 9 in the rollers 8. It will be apparent that the nozzles 29 are so inclined that the jets urge the rollers 8 to rotate in the clockwise direction as viewed in FIG. 1 so that the rod 2 is advanced to the right partly directly by the horizontal component of the jet friction and partly by the friction of the rollers 8 until the end of the rod abuts the stop 23. The rod 2 then stops for a moment until it is cut by the cutter blade 21 of the rotating vane wheel 16. The end part 2″ cut from the rod 2 drops through an aperture 36 in the tabletop 5 to a container (not shown). The rod 2 can then again follow the feed force and again reaches the stop 23 just before the blade 21 severs it again, and this action is repeated continously.

In order to increase the driving action on the feed rollers 8 of the jets leaving the nozzles 29, the rollers can be constructed like the roller 8a shown in FIG. 4. This roller 8a has regularly circumferentially spaced series transverse grooves 37 formed in its periphery so that it is rotated not only by the air friction but also by direct impingement of the jet of air on the corresponding radially extending edges of the grooves, i.e. it acts as a vane wheel. The base of the peripheral groove 9 (shown in FIG. 2) is given the reference numeral 9′ in FIG. 4 while the outer end of the rectangular part of the groove cross-section receiving the rod 2 is denoted by reference 9″.

With cutting devices of this type which have been tried out in practice, the vane wheel rotates at a speed of about 500 to 800 revolutions per second, corresponding to a feed rate of somewhat about 5 to 8 metres per second for the rod 2 given a cut piece length of 10 mm., in view of the short stoppage interval required in each case. The nozzles 29 can provide a feed speed of this kind in conjunction with the rollers 8 without any difficulty. However, care must be taken to ensure that the piece of rod cut off per unit of time corresponds very accurately to the part of the rod subsequently delivered per unit of time by the extrusion press 3. If the vane wheel 16 rotates too rapidly, too many pieces 2″ are cut off and the sagging part 2′ of the rod stretches and finally breaks. If the vane wheel 16 rotates too slowly, the sag of the part 2′ increases so that this part also breaks because of its weight. In this connection it must be noted that the nitrocellulose rod 2 delivered by the extrusion press 3 is relatively soft and the air jets meeting it from the nozzles 29 not only provide the feed but also have the very favourable effect of sharply drying the outer coating of the rod 2 and thus producing a kind of "skin" thereon to prevent any deformation of the pieces 2″ during and after cutting.

To control the speed of the vane wheel 16 and thus the repetition rate of cutting of the cutting blade 21 in accordance with the rate of delivery of the extrusion press 3, the very high speeds mentioned hereinbefore require a very sensitive electromagnetic valve 11. This electromagnetic valve 11 shown diagrammatically in FIG. 5 comprises a magnet winding 38 which on energization attracts a magnetic core 39 so that the valve 11 is opened against the force of a spring (not shown in FIG. 5) to an extent dependent upon the magnitude of the energization current.

As shown in FIG. 5 the control device 33 comprises a transformer 40 whose primary winding 41 is connected to the power supply and whose secondary winding 42 cooperates with two diodes 43 to form a conventional full-wave rectifier 44, whose terminals are denoted by the plus sign and minus sign. The output circuit of the rectifier 44 contains the emitter-collector circuit of a first transistor T1 in series with the magnet winding 38, with which a diode 45 is connected in parallel to receive the current flowing in the magnet winding 38 when the output circuit is blocked by the transistor T1. The base of the latter transistor is connected to the collector of a second transistor T2. The positive terminal of a battery 45 is connected to the emitter of the transistor T2 direct and via a resistor 46 to its collector. The emitter of a third transistor T3 is also connected to the positive terminal of the battery 45 while its collector is connected directly to the base of the transistor T2 and via a resistor 47 to the negative pole of the rectifier 44. The base of the transistor T3 is connected via the photo-resistance 35 to the movable contact 48 of a potentiometer 49. The position of the movable contact 48 of potentiometer 49 is adjustable by means of a knob 50 also shown in FIG. 1. Potentiometer 49 is connected at one end to the emitters of the transistor T3 and of a fourth transistor T4 and at the other end to a resistor 51. A capacitor 52 in parallel with the series circuit of the potentiometer 49 and the resistor 51 can be charged by a battery 53 via resistor 54. The capacitor 52 is also in series with a resistor 55 and the emitter-collector circuit of the transistor T4 so that it can be discharged via the latter, the value of the discharge resistor 55 being less than that of the charging resistor 54. The base of the transistor T4 is connected via the photo-resistance 34 to the emitter of transistor 14 and via a resistor 56 to its collector.

A lamp 57 is so arranged as to illuminate the photo-resistances 34 and 35 simultaneously if the sagging part 2′ of the rod 2 does not occlude one or other of these photo-resistances. In FIG. 5 the sagging part 2′ of the rod is shown in section somewhat below the bottom photo-resistance 34; the sag is then excessive and the speed of the vane wheel 16 must be increased in order to reduce the sag and this means that the electromagnetic valve 11 must be opened more. This effect is obtained as follows with the circuit arrangement described:

Since the photo-resistance 34 is illuminated, its resistance value is low and the base of the transistor T4 is practically at the same potential as its emitter. The transistor T4 is cut off and the capacitor 52 is charged up by the battery 53 via the resistor 54. The voltage at potentiometer 49 increases and consequently the bias of the emitter of the transistor T3 with respect to its base increases, the base having practically the same potential as the potentiometer contact 48 because of the low resistance of the photo-resistance 35. With the increase of the emitter bias the emitter-collector resistance of the transistor T3 is reduced and the same applies to the voltage drop at this resistance in series with the resistance 47. This lower voltage drop is between the emitter and base of the transistor T2 which thus becomes cut off. The voltage drop at the emitter-collector resistance of the transistor T2 in series with the resistance 46 increases as does also the bias between the emitter and base of the transistor T1. Thus, since the transistor T1 becomes more conductive, the output current of the rectifier 44 flowing through the emitter-collector circuit of the transistor T1 and through the magnet winding 38 increases, and the electromagnetic valve 11 is opened more and the increased jet of air 15 increases the speed of revolution of the wheel 16. The number of cuts per second thus increases and the adjustment of the potentiometer contact 48 is such that the rod 2 is now cut into pieces more rapidly at its free end than it can be delivered by the extrusion press 3.

The sag of the part 2′ then decreases until it reaches the chain-dotted position 2′₁ in which it occludes the bottom photo-resistance 34. The resultant increase in the value of the resistance 34 increases the emitter-base bias conductivity of the transistor T4 so that the capacitor 52 discharges more rapidly through the resistor 55 than it is charged by the battery 53 via the resistor 54. The voltage at the potentiometer 49 drops and hence the same applies to the emitter-base bias of the transistor T3. The current through the magnet winding 38 is thus now reduced via the transistor cascade T1 to T3 and the electromagnetic valve 11 is actuated in the closing direction slightly and the speed of the vane wheel or the number of cuts per second is reduced.

The contact 48 of the potentiometer 49 can be so adjusted that the number of cuts corresponds to the speed of delivery of the press 3 when the photo-resistance 34 is inoperative. Because of the inertia of the vane wheel 16, if the part 2' of the rod is shortened it will usually be shortened beyond the position 2' and therefore reach a position in which it does not occlude either of the photo-resistances 34 and 35. As shown above the speed of the vane wheel 16 then increases again so that the part 2' finally reaches the position 2'₂ in which it occludes the top photo-resistance 35. The result of this is an increase in the resistance between the potentiometer contact 48 and the base of the transistor T3. The emitter-base bias of the transistor T3 then becomes much greater than if the photo-resistance 34 is occluded so that the current through the magnet winding 38 is reduced still more via the transistor cascade T1–T3 and the amount of air delivered by the electromagnetic valve 11 is no longer sufficient to maintain a vane wheel speed corresponding to the speed of delivery of the extrusion press 3. The sag of the part 2' increases, usually so rapidly that it again returns to the original position shown in solid lines. The part 2' will thus usually oscillate between a position beneath the bottom photo-resistance 34 and top position 2'₂; it can, however, in certain circumstances oscillate for example only between the top position 2'₂ and a position between the two photo-resistances 34 and 35. Of course, the two photo-resistances 34 and 35 may also be disposed so close together that the part 2' immediately begins to mask the top photo-resistance 35 when it leaves the bottom photo-resistance 34.

What I claim is:

1. A method of cutting pieces off a length of material, which method comprises the steps of: advancing the length towards a stop through the path of a cutter rotating in a plane transverse to the direction of advance of the length so that the cutter acts to cut off said piece when the end of the length abuts against the stop, the cutter being rotated under the action of a jet of fluid so that the intensity of said jet controls the speed of rotation of the cutter, and controlling the intensity of said jet by the repetition rate at which said length end abuts against said stop.

2. A method as claimed in claim 1 in which said length is extruded under pressure in such a way that it can sag when its free end abuts against the stop so that the amount of sagging is controlled by the repetition rate at which said end abuts against the stop, and utilizing the amount of sagging to control the intensity of the fluid jet controlling the speed of rotation of the cutter.

3. A method as claimed in claim 2 in which variations in the amount of sagging are caused to produce an electrical control effect which is utilized to vary the intensity of said fluid jet.

4. A method as claimed in claim 3 in which said control effect is caused by the sagging part of the material moving across a path of a light beam to a device converting variations in light intensity into said electrical control effect.

5. A method as claimed in claim 4 in which movement of said sagging part in one direction causes an increase in the intensity of said fluid jet and movement in the other direction causes a decrease in said jet intensity.

6. A method as claimed in claim 3 in which said control effect is utilized to control an electromagnetically operated valve which regulates the supply of fluid to said jet.

7. A method as claimed in claim 1, in which the length of the material is advanced to the stop by a feed roller the rotation of which is caused by a second jet of fluid, the intensity of said second jet of fluid defining the speed of rotation of the feed roller and being controlled in the same manner as that of the jet of fluid controlling the speed of rotation.

8. A method as claimed in claim 7 in which the length of the material travels on a plurality of said rollers each separately rotated by a second jet of fluid.

9. A method as claimed in claim 7 in which the length of material travels in a groove on the periphery of said feed roller and a second jet of fluid is directed on to the length of material to hold it confined within the groove.

10. Apparatus of the class described, comprising a stop, means for advancing a length of material towards said stop, a cutter, a vaned wheel carrying said cutter so that the cutter is rotatable in a plane transverse to the direction of advance of the length to cut off a piece of material when the free end of said strip abuts against the stop, means for directing a first jet of fluid on to the vanes of said wheel to rotate the same, jet intensity-varying means for varying the intensity with which said jet is directed on to said vanes in response to variations in the repetition rate at which said free end abuts against said stop.

11. Apparatus as claimed in claim 10, in which said advancing means includes means for extruding said length of material towards said stop in such a manner that a sag occurs when the free end abuts against the stop and the jet intensity-varying means includes means for utilizing the amount of sagging to control the first jet intensity.

12. Apparatus as claimed in claim 11 in which said sagging utilization means includes electrical control means for producing a control effect, and in which said intensity-varying means includes an electrically controllable valve for utilizing said control effect to control the intensity of said jet.

13. Apparatus as claimed in claim 12 in which said sagging utilization means includes a light source and at least one light sensitive circuit element positioned to receive light from said source, the source and circuit element being so positioned with respect to the sag in said length of material that variations in the amount of sagging vary the amount of light from said source received by said circuit element, said circuit element being connected to said control means for producing said control effect.

14. Apparatus as claimed in claim 13 in which two light sensitive circuit elements are so positioned that the sagging part of the material length can cut off light from the source of one or the other thereof by movement in either of two directions to cause an increase and decrease, respectively, in said first jet intensity.

15. Apparatus as claimed in claim 14 in which said two circuit elements are disposed at different heights and are so connected to said electrical control means that when the two elements are simultaneously illuminated the valve is open to a certain extent whereas, when the sag in the length cuts off light to the upper element, the valve is relatively closed and the repetition rate of cutting of said cutter is reduced, and when the sag in the length cuts off light to the lower element, the valve assumes an intermediate position.

16. Apparatus as claimed in claim 11 in which said means for advancing said length of material comprises at least one vaned feed roller and means for directing a further jet of fluid against the vanes of said feed roller to rotate the same.

17. Apparatus as claimed in claim 16 in which a plurality of said feed rollers are arranged in tandem and each is individually driven by one of a plurality of further jets of fluid.

18. Apparatus as claimed in claim 17 in which a guide bushing for the length of material is provided between adjacent feed rollers.

19. Apparatus as claimed in claim 16 in which the fed roller is provided with a peripheral groove in which the length of material can travel and the means for directing said further jet of fluid against said vanes is arranged to direct said further jet so as to hold the length of material confined within said groove.

20. Apparatus as claimed in claim 19 in which the means for directing said further jet of fluid against said vanes is a nozzle connected to a supply of compressed air, which nozzle is so inclined to the path of movement of said length of material that the compressed air impinges against said material with a velocity component in the direction of said path.

21. Apparatus as claimed in claim 19 in which the groove has a cross section, the radially inner part of which is shaped for receiving the length of material therein and has a constant width, and the radially outer part tapers divergently outwardly.

References Cited by the Examiner

UNITED STATES PATENTS 2,642,774  6/1953  Picard et al. _____ 83—355

FOREIGN PATENTS 1,012,553  11/1954  Germany.

WILLIAM W. DYER, JR., *Primary Examiner.*

L. B. TAYLOR, *Assistant Examiner.*